US012410359B2

United States Patent
Odi et al.

(10) Patent No.: US 12,410,359 B2
(45) Date of Patent: Sep. 9, 2025

(54) NANOPARTICLE FLUIDS FOR AN AI-ASSISTED WATER ALTERNATING GAS PROCESS

(71) Applicant: ARAMCO SERVICES COMPANY, Houston, TX (US)

(72) Inventors: Uchenna Odi, Missouri City, TX (US); Nouf Jabri, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/483,781

(22) Filed: Oct. 10, 2023

(65) Prior Publication Data

US 2025/0115804 A1    Apr. 10, 2025

(51) Int. Cl.
*C09K 8/584* (2006.01)
*E21B 43/16* (2006.01)

(52) U.S. Cl.
CPC ............ *C09K 8/584* (2013.01); *E21B 43/164* (2013.01); *E21B 43/166* (2013.01);
(Continued)

(58) Field of Classification Search
CPC ... C09K 8/584; C09K 2208/10; E21B 43/164; E21B 43/166; E21B 2200/20; E21B 2200/22
See application file for complete search history.

(56) References Cited

U.S. PATENT DOCUMENTS

| 8,622,129 B2 | 1/2014 | Collins et al. | |
|---|---|---|---|
| 2006/0167147 A1* | 7/2006 | Asgari | B01J 13/0091 524/265 |

(Continued)

FOREIGN PATENT DOCUMENTS

| CN | 107448179 A | 12/2017 |
|---|---|---|
| CN | 110130859 A | 8/2019 |

(Continued)

OTHER PUBLICATIONS

Odi, Uchenna, "Incorporation of Homogenizer In Nanoemulsion Injection Scheme for Enhanced Oil Recovery"; Improved Oil and Gas Recovery; vol. 2; pp. 1-18; Mar. 2018 (18 pages).

(Continued)

*Primary Examiner* — Silvana C Runyan
(74) *Attorney, Agent, or Firm* — Osha Bergman Watanabe & Burton LLP (57) ABSTRACT

A treatment fluid including an aqueous colloid containing a first surfactant and a plurality of nanoparticles encapsulated by a second surfactant. A method for preparing a treatment fluid including mixing a plurality of metallic oxide nanoparticles with a first surfactant to form an intermediate solution. A second surfactant is added to the intermediate solution to form nanoparticles encapsulated by the second surfactant. A method of extracting hydrocarbons from a well environment and storing carbon dioxide in the well environment including injecting a first amount of carbon dioxide and a first amount of a treatment fluid into a hydrocarbon reservoir via an injection well in a well environment. The treatment fluid treatment fluid including an aqueous colloid containing a first surfactant and a plurality of nanoparticles encapsulated by a second surfactant. Subsequently, determining a byproduct amount of the carbon dioxide extracted from the well environment.

14 Claims, 7 Drawing Sheets

(52) U.S. Cl.
CPC ...... *C09K 2208/10* (2013.01); *E21B 2200/20* (2020.05); *E21B 2200/22* (2020.05)

(56) References Cited

U.S. PATENT DOCUMENTS

| | | | |
|---|---|---|---|
| 2015/0233222 | A1 | 8/2015 | Teklu et al. |
| 2021/0371726 | A1* | 12/2021 | Kanj ............... E21B 43/162 |
| 2022/0025248 | A1* | 1/2022 | Wang ............... C09K 8/70 |
| 2023/0064753 | A1 | 3/2023 | Ayirala et al. |
| 2023/0222269 | A1* | 7/2023 | Al-Jabri ............ E21B 43/16 703/9 |
| 2023/0332041 | A1* | 10/2023 | Nguyen ............. C09K 8/92 |

FOREIGN PATENT DOCUMENTS

| | | | |
|---|---|---|---|
| CN | 110318716 | A | 10/2019 |
| CN | 107448179 | B | 3/2020 |
| RU | 1 277 666 | A1 | 11/1999 |
| RU | 1 755 616 | A1 | 11/1999 |
| RU | 2 263 205 | C1 | 10/2005 |
| WO | 2011/041086 | A1 | 4/2011 |

OTHER PUBLICATIONS

Massarweh, Osama et al., "A review of recent developments in CO2 mobility contol in enhanced oil recovery"; Petroleum; vol. 8, Issue 3; pp. 291-317; Sep. 2022 (27 pages).

Arulkumaran, Kai et al., "Deep Reinforcement Learning: A brief survey"; IEEE Signal Processing Magazine; vol. 34, Issue 6; pp. 26-38; Nov. 2017 (13 pages).

Moradi, B. et al., "Experimental study of water-based nanofluid alternating gas injection as a novel enhanced oil-recovery method in oil-wet carbonate reservoirs"; Journal of Natural Gas Science and Engineering; vol. 27, Part 1; pp. 64-73; Nov. 2015 (10 pages).

Aziz, Hassan et al., "A review on nanofluid water alternating gas (N-WAG): application, preparation, mechanism, and challenges"; Arabian Journal of Geosciences; vol. 14, Issue 14, Article: 1416; pp. 1-12; Jul. 2021 (12 pages).

Li, Hangyu et al., Machine Learning-Assisted Prediction of Oil Production and CO2 Storage Effect in CO2-Water-Alternating-Gas Injection (CO2-WAG); Applied Sciences; vol. 12, Issue 21, Article 10958; pp. 1-18; Nov. 2022 (18 pages).

Al Matroushi, M. et al., "Possibility of Nanofluid/Gas Alternating Injection as an EOR Method in an Oil Field"; Proceedings of the Abu Dhabi International Petroleum Exhibition and Conference; Paper No. SPE-177434-MS; pp. 1-15; Nov. 9, 2015 (15 pages).

Afekare, Dayo A., "A Systematic Multiscale Investigation of Nanoparticle-Assisted CO2 Enhanced Oil Recovery (EOR) Process for Shale Oil Reservoirs"; A dissertation submitted to the Graduate Faculty of the Louisiana State University and Agricultural and Mechanical College in partial fulfillment of the requirements for the degree of Doctor of Philosophy in the Craft & Hawkins Department of Petroleum Engineering; pp. ii-217; May 2021 (226 pages).

Al-Shargabi, Mohammed et al., "Carbon Dioxide Applications for Enhanced Oil Recovery Assisted by Nanoparticles: Recent Developments"; ASC Omega; vol. 7, Issue 12; pp. 9984-9994; Mar. 29, 2022 (11 pages).

Janssen, Martijn T. G. et al., "Mechanistic Modeling of Water-Alternating-Gas Injection and Foam-Assisted Chemical Flooding for Enhanced Oil Recovery"; Industrial & Engineering Chemistry Research; vol. 59, Issue 8; pp. 3606-3616; Feb. 26, 2020 (11 pages).

Cao, Changxiao et al., "Water-based nanofluid-alternating-CO2 injection for enhancing heavy oil recovery: Considering oil-nanofluid emulsification"; Journal of Petroleum Science and Engineering; vol. 205, Article 108934; pp. 1-13; Oct. 2021 (13 pages).

Aljabri, Nouf M. et al., "Nanoemulsion: An emerging technology for oilfield application between limitations and potentials"; Journal of Petroleum Science and Engineering; vol. 208, Part A, Article 109306; pp. 1-19; Jan. 2022 (19 pages).

Lee, Kun Sang et al., "CO2 Storage Coupled with Enhanced Oil Recovery"; pp. 39, 51, 58-68, 73-87, 91-99; 2020 (37 pages).

Odi, Ochenna, "Optimal Process Design for Coupled CO2 Sequestration and Enhanced Gas Recovery in Carbonate Reservoirs"; A dissertation submitted to the Office of Graduate and Professional Studies of Texas A&M University in partial fulfillment of the requirements for the degree of Doctor of Philosophy; Major Subject: Petroleum Engineering; pp. 8, and 76-80; Dec. 2013 (6 pages).

* cited by examiner

NANOPARTICLE FLUIDS FOR AN AI-ASSISTED WATER ALTERNATING GAS PROCESS

BACKGROUND

In the oil and gas industry, oil recovery methods may be used to produce or further produce hydrocarbons from a hydrocarbon reservoir within a formation. Each oil recovery method may be categorized as a primary, secondary, and/or tertiary recovery method. A water alternating gas (WAG) process has traditionally been categorized as a secondary or tertiary recovery method, which may be considered an enhanced oil recovery method. However, the WAG process may be performed at any time during the productive life of the hydrocarbon reservoir.

WAG processes tend to cyclically alternate the injection of a miscible gas, such as carbon dioxide ($CO_2$), and water into the hydrocarbon reservoir to extract trapped hydrocarbons to the surface of the earth via a production well. Following the injection of miscible gas via an injection well, dissolution of the miscible gas and trapped hydrocarbons may occur to form a solution of mobilized hydrocarbons that reestablishes a hydrocarbon flow path within the hydrocarbon reservoir due to decreased viscosity of the solution relative to the trapped hydrocarbons. Following the injection of water via the injection well, the water may flush the solution of mobilized hydrocarbons towards the production well to allow the solution of mobilized hydrocarbons to be extracted. In turn, as the water flushes the solution, some miscible gas may take the place of the hydrocarbons within the hydrocarbon reservoir and remain in the reservoir for storage.

The environmental effects of $CO_2$ on the atmosphere are of particular concern as $CO_2$ is a "greenhouse gas" that may contribute to global warming. As such, sustainability efforts have become a recent societal goal to mitigate global warming. Altering the goals of the traditional WAG process to, at least in part, capture and store $CO_2$ (i.e., $CO_2$ sequestration) has emerged as a possible solution for reducing $CO_2$ in the atmosphere to mitigate global warming.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a treatment fluid containing an aqueous colloid that is formed from a first surfactant and a plurality of nanoparticles encapsulated by a second surfactant.

In another aspect, embodiments disclosed herein relate to a method for preparing a treatment fluid by mixing a plurality of metallic oxide nanoparticles with a first surfactant to form an intermediate solution and then adding a second surfactant to that intermediate solution, resulting in nanoparticles encapsulated by the second surfactant.

In another aspect, embodiments disclosed herein relate to a method of extracting hydrocarbons from a well environment and storing carbon dioxide in the well environment. Initially, a first amount of carbon dioxide and a first amount of a treatment fluid is injected into a hydrocarbon reservoir through an injection well in the well environment. The treatment fluid contains an aqueous colloid that is formed from a first surfactant and a plurality of nanoparticles encapsulated by a second surfactant. Subsequently, a byproduct amount of carbon dioxide is extracted from the well environment.

Other aspects and advantages of the claimed subject matter will be apparent from the following description and the appended claims.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a memory" includes reference to one or more of such memories.

As used here and in the appended claims, the words "comprise," "has," and "include" and all grammatical variations thereof are each intended to have an open, non-limiting meaning that does not exclude additional elements or steps.

"Optionally" and variations thereof means that the subsequently described event or circumstances may or may not occur. The description includes instances where the event or circumstance occurs and instances where it does not occur.

When the word "approximately" or "about" and variations thereof are used, this term may mean that there can be a variance in value of up to +10%, of up to 5%, of up to 2%, of up to 1%, of up to 0.5%, of up to 0.1%, or up to 0.01%.

The term "substantially" and variations thereof as used refer to a majority of, or mostly, as in at least about 50%, 60%, 70%, 80%, 90%, 95%, 96%, 97%, 98%, 99%, 99.5%, 99.9%, 99.99%, or at least about 99.999% or more.

Ranges may be expressed as from about one particular value to about another particular value, inclusive. When such a range is expressed, it is to be understood that another embodiment is from the one particular value to the other particular value, along with all particular values and combinations thereof within the range.

The phrases "artificial intelligence," "machine learning," "deep learning," and "pattern recognition" are often interchanged and used synonymously. This variation of nomenclature tends to arise because the field of "extracting patterns and insights from data" was developed simultaneously and disjointedly among a number of classical arts like mathematics, statistics, and computer science. For consistency, the term "artificial intelligence" will be adopted herein and denoted "AI." However, a person of ordinary skill in the art will recognize that the concepts and methods detailed hereafter are not limited by this choice of nomenclature. Further, in some fields, machine learning (ML) models may be considered a subset within AI models. As such, an ML model may more specifically describe the AI model or a portion of the AI model depending on the AI model selected.

It is to be understood that one or more of the steps shown in the flowcharts may be omitted, repeated, and/or performed in a different order than the order shown.

Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In the following description of FIGS. 1-10, any component described regarding a figure, in various embodiments disclosed herein, may be equivalent to one or more like-named components described regarding any other figure. For brevity, descriptions of these components will not be repeated regarding each figure. Thus, each and every embodiment of the components of each figure is incorporated by reference and assumed to be optionally present within every other figure having one or more like-named components.

Additionally, in accordance with various embodiments disclosed herein, any description of the components of a figure is to be interpreted as an optional embodiment which may be implemented in addition to, in conjunction with, or in place of the embodiments described regarding a corresponding like-named component in any other figure.

In one aspect, embodiments disclosed herein relate to the formulation of a treatment fluid containing encapsulated metal oxide nanoparticles and the process of preparing this treatment fluid for use. In other aspects, embodiments disclosed herein relate to a method to extract residual hydrocarbons from a formation using a water alternating gas process with the treatment fluid.

Water alternating gas processes contain a miscible gas phase and an aqueous phase to extract residual hydrocarbons. It is standard practice to use water as the aqueous phase and carbon dioxide is used as the miscible gas phase. A water alternating gas process functions by alternating the injection of the miscible gas phase and the aqueous phase into a reservoir. The miscible gas phase dissolves into the trapped hydrocarbons to mobilize the hydrocarbons for extraction. The aqueous phase assists in flushing the mobilized hydrocarbons towards the extraction well. Using a metal oxide based nanofluid as a treatment fluid in place of water as the aqueous phase further reduces interfacial tension between the formation and the residual hydrocarbons, improving the yield of hydrocarbons in the extraction process. Simultaneously, the treatment fluid maximizes the solubility of carbon dioxide into the aqueous phase, improving the mobilization of the trapped hydrocarbons. The carbon dioxide may be at supercritical conditions when injected into the reservoir.

In one or more embodiments, a treatment fluid contains nanoparticles, a first surfactant, a second surfactant, and brine. The nanoparticles may be first added to the first surfactant, followed by the second surfactant, with brine added in the last step. The first surfactant may include petroleum sulfonate and functions to provide a micelle around the nanoparticle, however, it is thermally unstable. The second surfactant may include cocamidopropyl hydroxysultaine. The role of the second surfactant is to encapsulate the micelles to form a stable capsule with an ionic strength of 75,000 ppm at a temperature of 100° C. for a year. The stable capsule may be in the form of a two layer membrane, where the initial micelle is a single layer and the second surfactant forms the second layer. The nanoparticles may be formed of one or more metal oxides. Suitable metal oxides include iron oxide, magnesium oxide, zinc oxide, aluminum oxide, and combinations thereof. The first surfactant may be in an amount ranging from about 5% to about 50% by weight of the treatment fluid. The second surfactant may be in an amount ranging from is about 5% to about 50% by weight of the treatment fluid.

The brine includes water. The water may be distilled water, deionized water, tap water, fresh water from surface or subsurface sources, production water, formation water, natural and synthetic brines, brackish water, natural and synthetic sea water, black water, brown water, gray water, blue water, potable water, non-potable water, other waters, and combinations thereof, that are suitable for use in a wellbore environment. In one or more embodiments, the water used may naturally contain contaminants, such as salts, ions, minerals, organics, and combinations thereof, as long as the contaminants do not interfere with the tracer particle operations.

Figure 1:
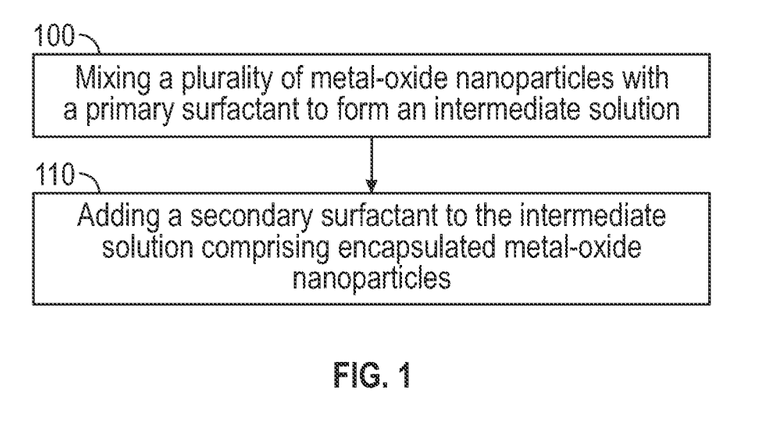
FIG. 1 illustrates a process of preparing a treatment fluid in accordance with one or more embodiments.

FIG. 1 illustrates a process of preparing the treatment fluid. In block 100, a plurality of metal oxide nanoparticles are mixed with a first surfactant in a vessel to form an intermediate solution. The vessel may contain an agitator to ensure adequate mixing. The nanoparticles may be in an amount ranging from about 0.02% to 0.08% by weight in about 5% to 50% by weight of the first surfactant in the treatment fluid. In block 110, the intermediate solution mixes with a second surfactant in the same vessel to form encapsulated metal oxide nanoparticles. This process of preparing the treatment fluid may occur in a vessel located proximate the well environment. This process may occur in a vessel at a different location and transported to the well environment either by a vehicle or by a process line. The present inventors have unexpectedly discovered that the sequential preparation of the treatment fluid as detailed above, results in encapsulated dispersed nanoparticles. "Dispersed nanoparticles" indicates that the encapsulated nanoparticles are evenly distributed throughout the treatment fluid, rather than forming a conglomeration of nanoparticles.

Figure 2:
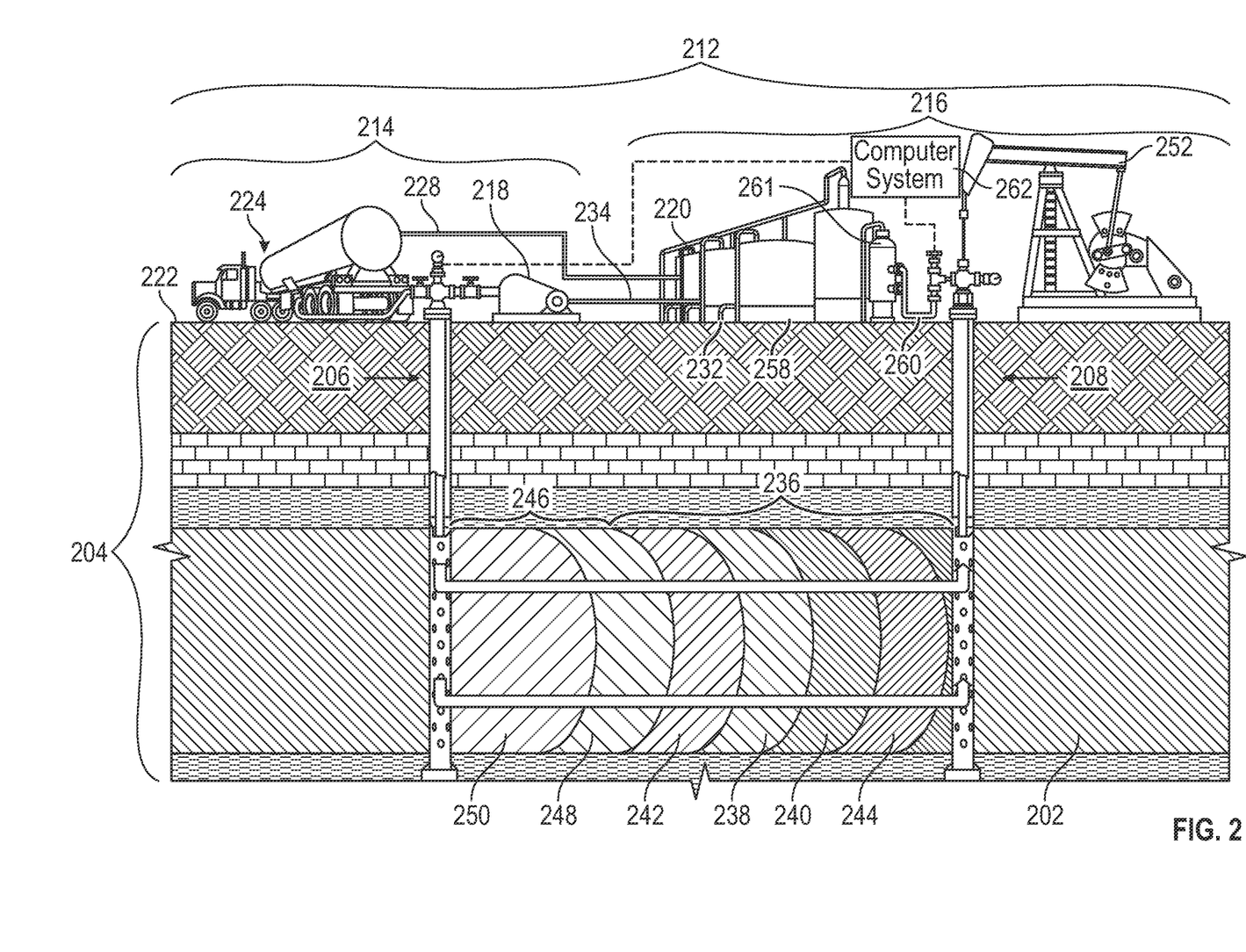
FIG. 2 illustrates a treatment system in accordance with one or more embodiments.

FIG. 2 illustrates a system for using the treatment fluid in a water alternating gas (WAG) process. Referring to FIG. 2, a fluid pumping system 212 contains an injection system 214 and a production system 216. The injection system 214 includes an injection well 206 extending into a formation 204 under the earth's surface 222 and penetrating through a hydrocarbon reservoir 202. The production system 216 includes a production well 208 extending into a formation 204 under the earth's surface 222 and penetrating through a hydrocarbon reservoir 202. The injection system 214 is located at a distance across the hydrocarbon reservoir 202 from the production system 216. The area of the hydrocarbon reservoir 202 containing the injection well 206 and the production well 208 and a plurality of WAG zones 250, 248, 242, 238, 240, and 244 is considered the well environment. The plurality of WAG zones 250, 248, 242, 238, 240, and 244 extends between the injection system 214 and the production system 216. When injection well 206 and production well 208 are vertical wells, each WAG zone 250, 248, 242, 238, 240, and 244 may form a layer, where the layers layer horizontally between the injection well 206 and 208. Such a layer is termed herein a "horizontal layer." When an injection well and a production well are horizontal or lateral wells (not shown), each WAG zone may form a layer, where the layers layer vertically between the injection well and production well. Such a layer is termed herein "vertical layer." In an exemplary configuration WAG zones 250, 248, 242, 238, 240, and 244 include aqueous zone 250, first carbon dioxide zone 248, accumulation zone 242, second carbon dioxide zone 238, miscible zone 240, and oil zone 244. Aqueous zone 250 contains a treatment fluid phase that includes the treatment fluid. The treatment fluid phase may be a drive phase that is initiated by a WAG cycle. First carbon dioxide zone 248 contains a carbon dioxide phase that includes carbon dioxide. The carbon dioxide in zone 248 may be supercritical at reservoir conditions. Accumulation zone 242 contains an accumulation phase. The accumulation phase may include fluid with accumulated nanoparticles and trapped carbon dioxide caused by a prior WAG cycle. Second carbon dioxide zone 238 contains a carbon dioxide phase that includes carbon dioxide. The carbon dioxide in zone 238 may be supercritical at reservoir conditions. Miscible zone 240 contains a miscible phase. The miscible phase may be caused by interaction of carbon dioxide and previous contact of residual oil with the treatment fluid. The previous contact may specifically be previous contact of residual oil with the nanoparticles in the treatment fluid. Oil zone 244 contains a mobilized oil phase. The mobilized oil phase may be caused by the WAG cycle. Zone 244 may also contain portions of the treatment fluid and the carbon dioxide as byproducts. The production system 216 is configured to extract hydrocarbons from zone 244.

It will be understood that through the present disclosure, where carbon dioxide is described, the carbon dioxide may be mixed with other miscible gases, such as, but not limited to, propane and butane, without departing from the scope of the disclosure.

Referring still to FIG. 2, the production well 208 may use a production pump 252 to extract the mobilized hydrocarbons, byproduct treatment fluid, and byproduct carbon dioxide. The production well 208 may lead to a separation unit 261 through a production process line 260 containing a produced amount of hydrocarbons and byproduct amounts of the treatment fluid and carbon dioxide. The separation unit 261 may be in fluid communication with one or more hydrocarbon storage tanks 258, one or more treatment fluid storage tanks 232, and/or one or more carbon dioxide storage tanks 220. Alternately or in combination, the treatment fluid and carbon dioxide or portions thereof may be routed directly back to the injection well 206 as a recycle stream without any storage unit. A combination of direct recycle streams and storage tanks may be used for the treatment fluid and/or the carbon dioxide. There may be a carbon dioxide process line 228 containing a carbon dioxide pump 229 from the carbon dioxide storage tank 220 to the injection well 206. There may be a treatment fluid process line 234 containing a treatment fluid pump 232 from the treatment fluid storage tank 232 to the injection well 206. A tanker 224 may be used to provide carbon dioxide or the treatment fluid to the injection well 206. Fluid pumping system 212 may be equipped to allow the tanker 224 to tie into either the carbon dioxide process line 228 or the treatment fluid process line 234. The system contains a computer system 262 that communicates between the production well and the injection well to optimize the extraction of hydrocarbons and maximize a storage amount of carbon dioxide under the earth's surface 222.

Referring to FIG. 2, to initiate a WAG treatment process, the injection well 206 and the production well 208 are identified. The reservoir may be initially treated with standard hydrocarbon production processes. The reservoir may contain residual hydrocarbons, that is hydrocarbons produced by additional methods of extraction. Alternately, the reservoir may be untreated, containing larger volumes of hydrocarbons.

Figure 3:
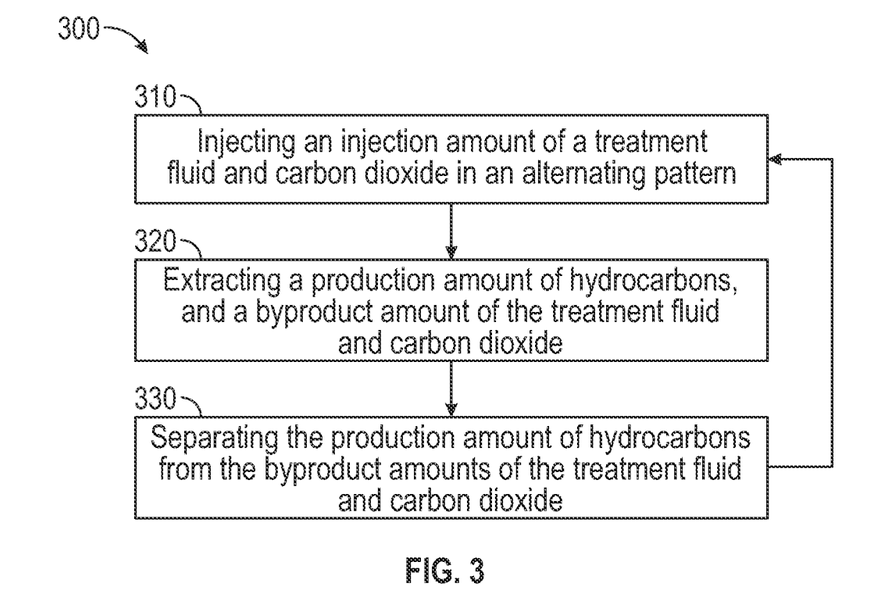
FIG. 3 illustrates a treatment method in accordance with one or more embodiments.

Referring to FIG. 3, in block 310 of WAG process 300, an injection amount a treatment fluid and an injection amount of carbon dioxide are injected in a repeatedly alternating pattern through the injection well into the reservoir. This alternating process may create different zones in the reservoir between the injection well and production well that lead to carbon dioxide mobilizing residual hydrocarbons for extraction from the production well. As the process progresses, the composition of each zone may vary. For example, if carbon dioxide is the component most recently injected, the closest zone in the reservoir to the injection well will be carbon dioxide, however, if the treatment fluid is the most recent component injected, the closest layer in the reservoir to the injection well will be the treatment fluid.

Referring back to FIG. 2, this process schematic shows an embodiment where the most recently injected component is the treatment fluid. In FIG. 2, the treatment fluid is most recently injected and has formed aqueous zone 250 in the reservoir closest to the injection well. The first carbon dioxide zone 248 is adjacent to aqueous zone 250 and contains the carbon dioxide phase that was injected before the treatment fluid in aqueous zone 250 and is moving towards the production well 208. The accumulation zone 242, moving towards the production well, contains primarily the treatment fluid that was injected before the carbon dioxide layer 248, with trapped carbon dioxide due to interactions between the treatment fluid and the carbon dioxide within the reservoir. The second carbon dioxide zone 238, moving towards the production well, contains primarily carbon dioxide, similar to the first carbon dioxide zone 248. The miscible zone 240, moving towards the production well 208, contains a miscible phase caused by the interaction between the carbon dioxide, the treatment fluid, and residual hydrocarbons. In the miscible zone 240, the carbon dioxide is dissolving into the residual hydrocarbons and mobilizing the hydrocarbons. Within the miscible zone 240, the treatment fluid is reducing interfacial tension between the hydrocarbons and the reservoir, further mobilizing the hydrocarbons. Within the miscible zone 240, the treatment fluid is maximizing the solubility of carbon dioxide in the aqueous phase, further mobilizing the hydrocarbons as the treatment fluid flushes the hydrocarbons towards the production well. In this process, a portion of the injected carbon dioxide is stored in the hydrocarbon reservoir 202. The oil zone 244 contains mobilized hydrocarbons along with a byproduct amount of the treatment fluid and carbon dioxide.

Referring to FIG. 3, in block 320 of WAG process 300, the water alternating gas process results in the extraction of a produced amount of hydrocarbons and a byproduct amount of the treatment fluid and carbon dioxide. In block 330 of WAG process 300, the produced amount of hydrocarbons is separated from the byproduct amounts of the treatment fluid and carbon dioxide. The byproduct amounts of the treatment fluid and carbon dioxide are recycled to block 310 for injection into the system. Some of the carbon dioxide will remain in the reservoir as storage for carbon capture efforts. The quantity of carbon dioxide stored may depend on factors including geological related parameters, the solubility of carbon dioxide into the aqueous phase, and the mass transfer of carbon dioxide into the oil phase. Geological related parameters include porosity, fracture network, and rock adsorption affinity. The WAG process 300 may maximize the affinity of carbon dioxide to adsorb or transfer into the rock, the aqueous phase, and the oil phase. The produced amount of hydrocarbons exits the system as the final product.

Throughout WAG process 300, an artificial intelligence controller scheme implemented in computer system 262 may adjust the injection flow rates and volumes of carbon dioxide and the treatment fluid to optimize the extraction of hydrocarbons and maximize the amount of carbon dioxide stored. The produced amount of hydrocarbons and the storage amount of carbon dioxide may be input into the artificial intelligence model, using a Markov decision process, to obtain an injection amount of hydrocarbons and an injection amount of carbon dioxide.

The alternating pattern of WAG process 300 may include N cycles where N is an integer greater than or equal to one. For example, if N=2, the two cycles include a first cycle and second cycle. The count of cycles (i.e., first and second) are denoted n where n increments by one from one to N. In brief, for the traditional WAG process, each of the N cycles may include the injection of gas, such as carbon dioxide ($CO_2$), into the hydrocarbon reservoir 202 followed by the injection of water into the hydrocarbon reservoir 202 further followed by the extraction of hydrocarbons from the hydrocarbon reservoir 202.

The injection system 214 may be configured to inject an nth set of injection amounts in turn into the hydrocarbon reservoir 202 via the injection well 206 for each of the N cycles. In the present WAG process, the nth set of injection amounts may include an nth amount of $CO_2$ and an nth amount of treatment fluid. Further, the nth amount of the treatment fluid may be injected into the hydrocarbon reservoir 202 via the injection well 206 using an injection pump 218. Note that each of the nth set of injection amounts may be colloquially referred to as "slugs" (e.g., a $CO_2$ slug).

Following injection of the nth amount of $CO_2$ into the hydrocarbon reservoir 202 via the injection well 206 for the nth cycle 236, the nth amount of $CO_2$ floods the hydrocarbon reservoir 202 as illustrated in the first carbon dioxide zone 238 in FIG. 2. In turn, due to the miscibility of the $CO_2$, the $CO_2$ and the trapped hydrocarbons mutually dissolve to form a solution with reduced viscosity relative to the trapped hydrocarbons as illustrated in a miscible zone 240. Note that miscibility may be defined as the ability of fluids to mix in all proportions. In turn, the interfacial tension (IFT) between the solution and the rock of the hydrocarbon reservoir 202 reduces to allow the solution to travel along now reestablished hydrocarbon flow path. Note that miscibility is a function of pressure. As such, the pressure of the hydrocarbon reservoir 202 during each cycle of the WAG process desirably ensures the hydrocarbon reservoir 202 is above a minimum miscibility pressure.

Following the injection of the nth amount of the treatment fluid into the hydrocarbon reservoir 202, the nth amount of the treatment fluid floods the hydrocarbon reservoir 202 as shown in an accumulation zone 142. In turn, the nth amount of the treatment fluid may flush the solution in the miscible zone 240 into the oil zone 244, which may contain mobilized hydrocarbons.

If certain conditions within the hydrocarbon reservoir 202 are met, the solution within the oil zone 244 may be extracted to the surface of the earth 222 via the production well 208 as will be described in detail below. In turn, some of the $CO_2$ within the solution may remain in the pores of the rock of the hydrocarbon reservoir 202 where the trapped hydrocarbons were.

If certain conditions within the hydrocarbon reservoir 202 are not met, the solution within the miscible zone 240 and oil zone 244 may remain within the hydrocarbon reservoir 202 until the (n+1)th cycle 246 of the WAG process is performed. FIG. 2 illustrates the (n+1)th cycle 246 where an (n+1)th amount of $CO_2$ is illustrated in a $CO_2$ phase zone 248, and an (n+1)th amount of the treatment fluid is illustrated in an aqueous zone 250.

Once the fluid within the oil zone 244 reaches the production well 208, the production system 216 may be configured to extract the fluid from the hydrocarbon reservoir 202 using a production pump 252 in fluid communication with the production well 208. The amount of hydrocarbons for each of the N cycles may include an nth amount of hydrocarbons. The nth amount of hydrocarbons may be mixed with $CO_2$ and/or the treatment fluid if $CO_2$ and/or treatment fluid breakthrough has occurred.

Meters (not shown) within the fluid pumping system 212 may measure and store WAG data associated with each of the N cycles of the WAG process. The WAG data may include the values associated with the nth amount of $CO_2$ and the nth amount of the treatment fluid injected into the hydrocarbon reservoir 202, the nth amount of stored carbon dioxide stored within the hydrocarbon reservoir 202 (i.e., $CO_2$ sequestration), and the nth amount of produced hydrocarbons extracted from the hydrocarbon reservoir 202. Hereinafter, the value associated with the nth amount of carbon dioxide injected into the hydrocarbon reservoir 202 may be referred to as an nth value of an injection amount of carbon dioxide. The value associated with the nth amount of the treatment fluid injected into the hydrocarbon reservoir 202 may be referred to as an nth value of an injection amount of the treatment fluid. The value associated with the nth amount of stored carbon dioxide stored within the hydrocarbon reservoir 202 may be referred to as an nth value of a stored amount of carbon dioxide. The value associated with the nth amount of produced hydrocarbons extracted from the hydrocarbon reservoir 202 may be referred to as an nth value of a produced amount of hydrocarbons. The term "amount" may refer to a volume, density, concentration, and/or rate. The WAG data may be transferred from the fluid pumping system 212 to a computer system 262 via a network as shown by the dashed lines in FIG. 2. In turn, the computer system 262 may be configured to receive, store, and/or process the WAG data. Further, data generated or obtained using the computer system 262 may be transferred to the fluid pumping system 212 via the network. Both the computer system 262 and network is described in detail relative to FIG. 7.

The WAG process performed within the formation 204 as described in FIG. 2 may be modeled or simulated using a reservoir simulator. In these embodiments, the WAG data may be obtained from the reservoir simulator rather than measured and stored by meters within the fluid pumping system 212.

The reservoir simulator may mathematically model rock and the hydrocarbon reservoir 202 within the formation 204 as porous media. Further, the reservoir simulator may mathematically model fluid flow of $CO_2$, the treatment fluid, and hydrocarbons within the formation 204 and the fluid pumping system 212 using principles of fluid dynamics, such as Navier-Stokes equations. In particular, the Navier-Stokes equations describe how the velocity, pressure, temperature, and density of a moving fluid are related. Because the N cycles of the WAG process occur over time, the reservoir simulator may further model the rock, hydrocarbon reservoir 202, and fluid flow in the formation 204 over time for one or more WAG processes.

Updating the reservoir simulator may be done using, but not limited to, finite difference methods, finite element methods, and finite volume methods. As such, the reservoir simulator may be stored on a memory of a computer system 262, which, again, is described relative to FIG. 7. If the reservoir simulator is rendered as an image, the image may illustrate one or more injection wells 206 and one or more production wells 208 within the formation 204. However, a person of ordinary skill in the art will appreciate that the reservoir simulator may not be rendered as an image and only output values of interest. Hereinafter, the reservoir simulator is assumed to model one injection well 206 and one production well 208 to mimic the formation 204 illustrated in FIG. 2. However, a person of ordinary skill in the art will appreciate that the reservoir simulator may model more than one injection well 206 and/or more than one production well 206 without departing from the scope of the disclosure.

In one or more embodiments, the reservoir simulator is used to generate one or more outputs based on inputs that are fed into the reservoir simulator. These input/output values are used to form M training pairs <input(s), output(s)>, where M is an integer greater than or equal to one. For example, if M=2, the two training pairs include a first training pair and a second training pair. The count of training pairs (i.e., first and second) are denoted m, where m increments by one from one to M. For example, if m=1, an mth training pair describes a first training pair. The count m may describe a current cycle number like n.

Figure 4:
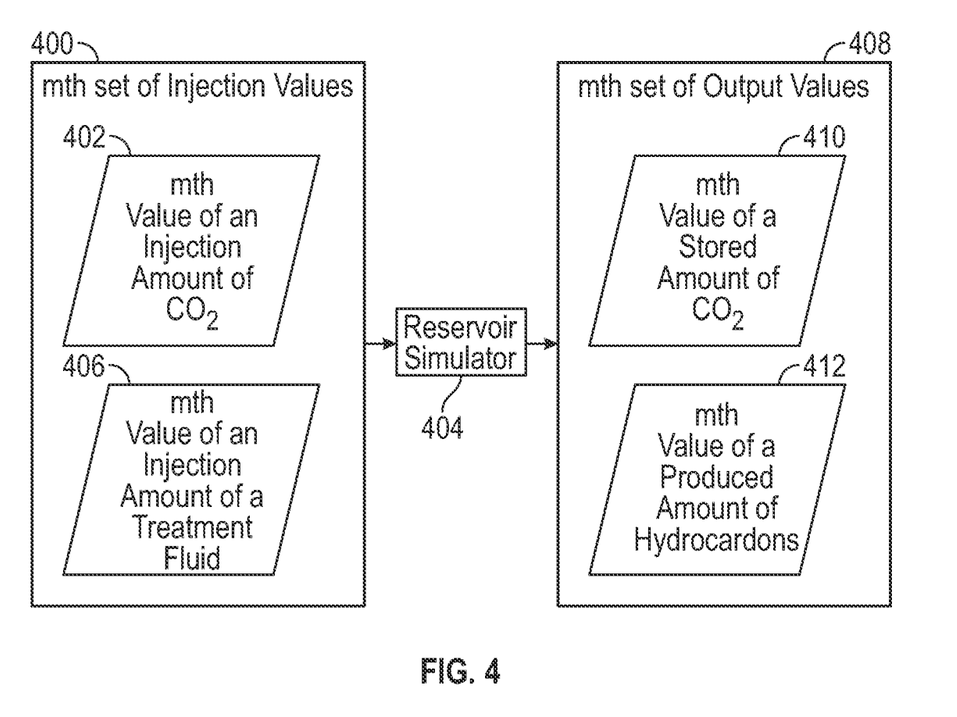
FIG. 4 illustrates a workflow in accordance with one or more embodiments.

Each of the M training pairs or the mth training pair includes an mth set of injection values 400 (input(s)) and an mth set of output values 408 as shown in FIG. 4. The mth set of injection values 400 includes an mth value of an injection amount of $CO_2$ 402 that may be injected into the modeled hydrocarbon reservoir within the reservoir simulator 404. The mth set of injection values 400 further includes an mth value of an injection amount of the treatment fluid 406 that may be injected into the modeled hydrocarbon reservoir within the reservoir simulator 404. Each of the mth set of injection values 400 may be assigned randomly, based on historical WAG data, based on a probability distribution, and/or based on the current states of the formation 204 or the modeled formation, among other methods.

The mth set of injection values 400 may be input into the reservoir simulator 404 to generate the mth set of output values 408. The mth set of output values 408 may include an mth value of a stored amount of $CO_2$ 410 stored within the modeled hydrocarbon reservoir within the reservoir simulator 404. The mth set of output values 408 may further include an mth value of a produced amount of hydrocarbons 412 extracted from the modeled hydrocarbon reservoir within the reservoir simulator 404.

The mth set of output values 408 may be directly obtained from the reservoir simulator 404. In other embodiments, the mth set of output values 408 may be sampled from an mth set of output probability distributions that may be directly obtained from the reservoir simulator 404. In these embodiments, the sampling method may be based on random sampling, Monte Carlo sampling, bootstrapping, or any other sampling method.

The process illustrated in FIG. 4 may be repeated to generate each of the M training pairs. In practice, tens to thousands of training pairs may be generated. The M training pairs may be used to train, at least in part, an artificial intelligence (AI) model.

Figure 5:
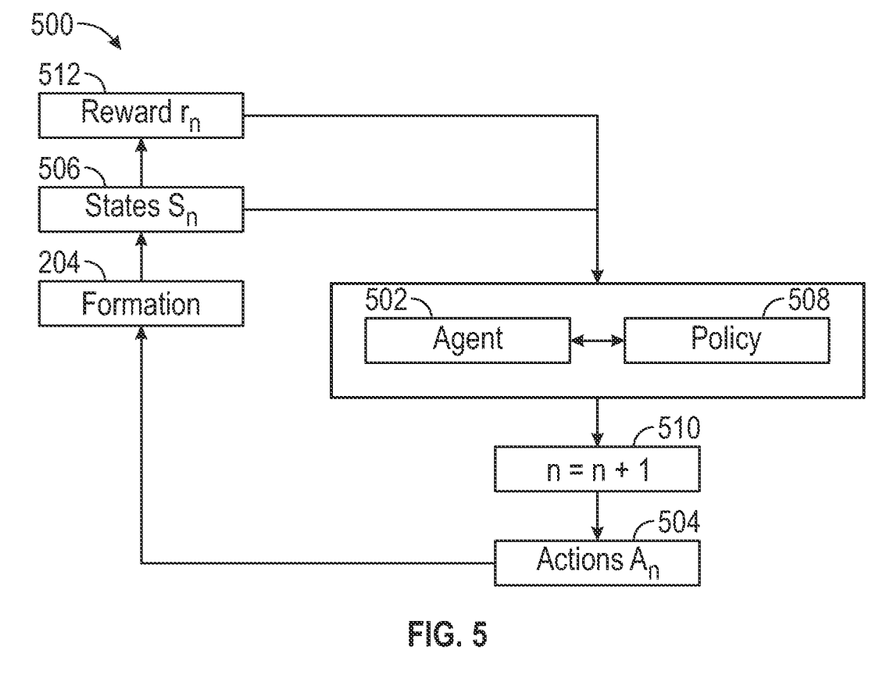
FIG. 5 illustrates a Markov decision process in accordance with one or more embodiments.

The AI model may include a Markov decision process (MDP). FIG. 5 illustrates the MDP 500 in accordance with one or more embodiments. The MDP 500 may rely on an agent 502 to interact with the formation 204 to determine actions 504 based on the current states 506 of the formation 204. Here, the formation 204a may be the physical formation 204 illustrated in FIG. 2 or the modeled formation within the reservoir simulator 404 as described relative to FIG. 4. The agent 502 uses its policy 508 to determine the actions 504 based, at least in part, on the current states 506 of the formation 204a.

For example, assume the current states 506 of the formation 204a are denoted $s_n$, which may come from a set of states S. The agent 502 may receive the current states $s_n$ 506 from the formation 204a. The agent 502 may then use its policy 508 to determine the next actions $a_{n+1}$ 504, which may be determined from a set of actions A, (once n increases by one as shown in block 510) that may be taken within the formation 204a. This process may continue for the N cycles of the WAG process. In other embodiments, this process may continue indefinitely where N→∞.

The agent 502 may learn what actions 504 produce desirable states and what actions 504 produce undesirable states by observing the consequences of the actions 504 (i.e., the updated states). This process may be referred to as reinforcement learning. In these embodiments, the agent 502 may learn and alter its behavior to use its policy Tt 508 to determine actions 504 that produce desirable states by mapping from states 506 to a probability distribution p over actions 504 where:

$$\pi: S \to p(A = a_n \mid S). \qquad \text{Equation (1)}$$

The agent 502 may learn and alter its behavior based on a rewards system or rewards function R. When actions 504 produce desirable states, a positive reward may be assigned as the reward $r_n$ 512 and passed to the agent 502. When actions 504 produce undesirable states, a negative reward or penalty may be assigned as the reward $r_n$ 512 and passed to the agent 502. For each "trajectory" or "rollout" of the policy 508, the agent 502 learns based on the previous states $s_{n-1}$, the previous actions $a_{n-1}$, the current states $s_n$ 506, and the reward $r_n$ 512 as illustrated in FIG. 5 to improve its policy 508. The goal of the agent 502 is to determine a policy 508 that maximizes the expected reward 512 where:

$$\pi^* = \text{argmax} \mathbb{E}[R \mid \pi]. \quad \text{Equation (2)}$$

In the context of this disclosure, desirable states may include storing an increased amount of $CO_2$ in the hydrocarbon reservoir 202 or the modeled hydrocarbon reservoir for the current cycle n relative to the previous cycle n−1 and extracting an increased amount of hydrocarbons from the hydrocarbon reservoir 202 or the modeled hydrocarbon reservoir for the current cycle n relative to the previous cycle n−1. In other words, additional $CO_2$ is stored and additional hydrocarbons are extracted after each cycle N.

The mapping performed by the policy 508 may be done by a neural network. In other embodiments, the AI model may be a neural network. As such, an introduction to neural networks is provided herein. While the term "neural network" is used hereinafter, a person of ordinary skill in the art will appreciate that the neural network may be a specialized neural network, such as a recurrent neural network (RNN) or long short-term memory (LSTM), without departing from the scope of the disclosure. It is emphasized that the following discussion of the neural network is a basic summary that should not be considered limiting as many variations of neural networks, RNNs, and LSTMs exist. Therefore, one of ordinary skill in the art will recognize that any variation of a neural network, RNN, or LSTM may be employed without departing from the scope of the disclosure.

Figure 6:
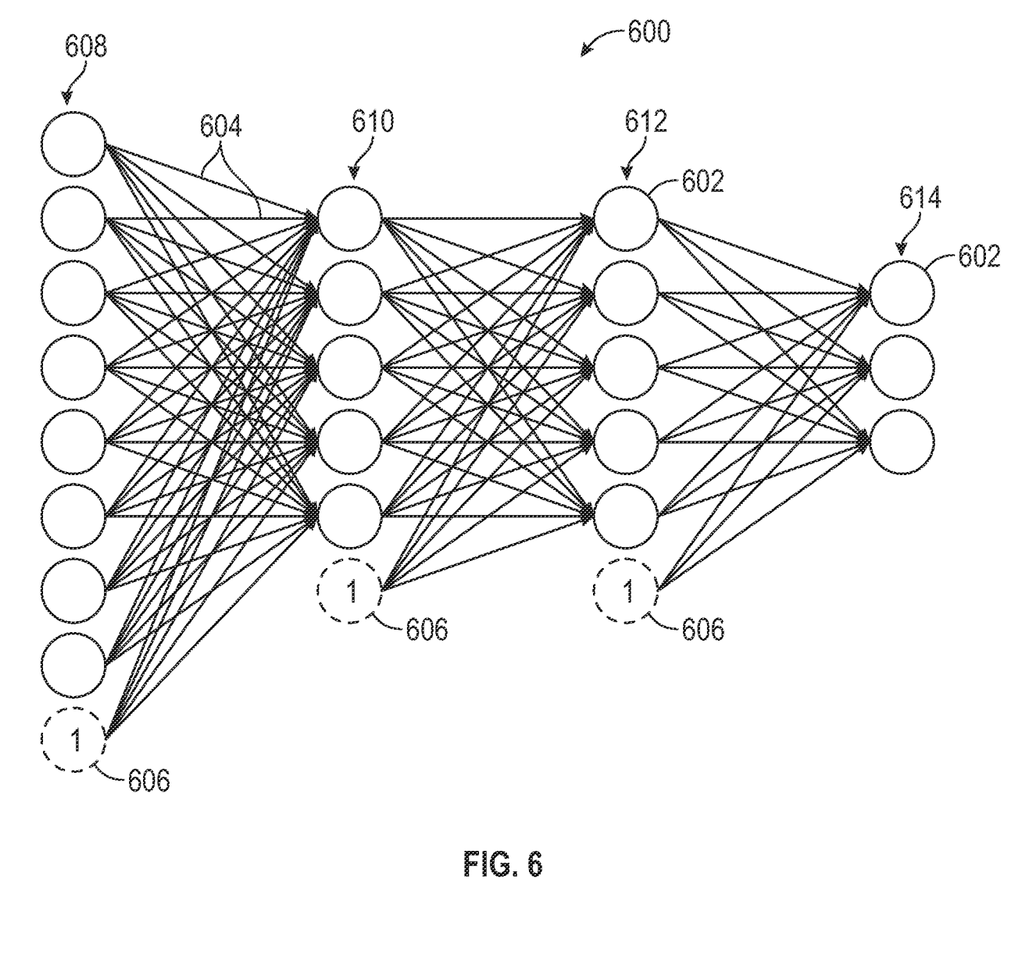
FIG. 6 illustrates a neural network in accordance with one or more embodiments.

FIG. 6 illustrates a neural network 600 in accordance with one or more embodiments. At a high level, a neural network 600 may be graphically depicted as being composed of nodes 602 and edges 604. The nodes 602 may be grouped to form layers. FIG. 6 displays four layers 608, 610, 612, 614 of nodes 602 where the nodes 602 are grouped into columns. However, each group need not be as shown in FIG. 6. The edges 604 connect the nodes 602 to other nodes 602. Edges 604 may connect, or not connect, to any node(s) 602 regardless of which layer 608, 610, 612, 614 the node(s) 602 is in. That is, the nodes 602 may be sparsely and residually connected. For example, in an RNN, nodes 602 in the output layer 614 may be connected by edges 604 to nodes 602 in the input layer 608 (though not shown in FIG. 6). As such, an RNN may be considered an autoregressive process.

A neural network 600 will have at least two layers, where the first layer 608 is the "input layer" and the last layer 614 is the "output layer." Any intermediate layer 610, 612 is usually described as a "hidden layer." A neural network 600 may have zero or more hidden layers 610, 612. A neural network 600 with at least one hidden layer 610, 612 may be described as a "deep" neural network or "deep learning method." If the AI model includes an MDP 500 that uses reinforcement learning and the policy 508 includes a deep neural network, the AI model may be considered to use deep reinforcement learning.

In general, a neural network 600 may have more than one node 602 in the output layer 614. In these cases, the neural network 600 may be referred to as a "multi-target" or "multi-output" network.

Nodes 602 and edges 604 carry associations. Namely, every edge 604 is associated with a numerical value. The edge numerical values, or even the edges 604 themselves, are often referred to as "weights" or "parameters." While training a neural network 600, a process that will be described below, numerical values are assigned to each edge 604. Additionally, every node 602 is associated with a numerical value and may also be associated with an activation function. Activation functions are not limited to any functional class but traditionally follow the form:

$$A = f\left(\sum_{i \in (incoming)} [(\text{node value})_i (\text{edge value})_i]\right), \quad \text{Equation (3)}$$

where i is an index that spans the set of "incoming" nodes 602 and edges 604 and $f$ is a user-defined function. Incoming nodes 602 are those that, when viewed as a graph (as in FIG. 6), have directed arrows that point to the node 602 where the numerical value is being computed. Some functions $f$ may include the linear function $f(x)=x$, sigmoid function $$f(x) = \frac{1}{1 + e^{-x}},$$

and rectified linear unit function $f(x)=\max(0,x)$, however, many additional functions are commonly employed. Every node 602 in a neural network 600 may have a different associated activation function. Often, as a shorthand, activation functions are described by the function $f$ by which it is composed. That is, an activation function composed of a linear function $f$ may simply be referred to as a linear activation function without undue ambiguity.

When the neural network 600 receives an input, the input is propagated through the neural network 600 according to the activation functions and incoming node values and edge values to compute a value for each node 602. That is, the numerical value for each node 602 may change for each received input while the edge values remain unchanged. Occasionally, nodes 602 are assigned fixed numerical values, such as the value of one. These fixed nodes 606 are not affected by the input or altered according to edge values and activation functions. Fixed nodes 606 are often referred to as "biases" or "bias nodes" as displayed in FIG. 6 with a dashed circle.

In some implementations, the neural network 600 may contain specialized layers, such as a normalization layer, pooling layer, or additional connection procedures, like concatenation. One of ordinary skill in the art will appreciate that these alterations do not exceed the scope of the disclosure.

The number of layers in a neural network 600, choice of activation functions, inclusion of batch normalization layers, and regularization strength, among others, may be described as "hyperparameters" that are associated to the neural network 600. It is noted that in the context of AI, the regularization of the neural network 600 refers to a penalty applied to the loss function of the neural network 600. The selection of hyperparameters associated to a neural network 600 is commonly referred to as selecting the neural network "architecture."

Once a neural network 600 and associated hyperparameters have been selected, the neural network 600 may be trained. To do so, the M training pairs as previously described may be provided to the neural network 600. In general, each of the M training pairs includes an input (i.e., the mth set of output values 408) and an associated target output (i.e., the mth set of injection values 400). Each associated target output represents the "ground truth," or the otherwise desired output upon processing the input. During training, the neural network 600 processes at least one input from the M training pairs to produce at least one output. Each neural network output is then compared to the associated target output from the M training pairs.

Returning to the neural network 600 in FIG. 6, the neural network 600 may be trained by first assigning initial values to the edges 604. These values may be assigned randomly, according to a prescribed distribution, manually, or by some other assignment mechanism. Once edge values have been initialized, the neural network 600 may act as a function such that it may receive an input from the M training pairs and produce an output. At least one input is propagated through the neural network 600 to produce an output.

The comparison of the neural network output to the associated target output from the M training pairs is typically performed by a "loss function." Other names for this comparison function include an "error function," "misfit function," and "cost function." Many types of loss functions are available, such as the log-likelihood function or cross-entropy loss function. However, the general characteristic of a loss function is that the loss function provides a numerical evaluation of the similarity between the neural network output and the associated target output from the M training pairs. The loss function may also be constructed to impose additional constraints on the values assumed by the edges 604. For example, a penalty term, which may be physics-based, or a regularization term may be added. Generally, the goal of a training procedure is to alter the edge values to promote similarity between the neural network output and associated target output for most, if not all, of the M training pairs. Thus, the loss function is used to guide changes made to the edge values. This process is typically referred to as "backpropagation."

While a full review of the backpropagation process exceeds the scope of this disclosure, a brief summary is provided. Backpropagation consists of computing the gradient of the loss function over the edge values. The gradient indicates the direction of change in the edge values that results in the greatest change to the loss function. Because the gradient is local to the current edge values, the edge values are typically updated by a "step" in the direction indicated by the gradient. The step size is often referred to as the "learning rate" and need not remain fixed during the training process. Additionally, the step size and direction may be informed by previous edge values or previously computed gradients. Such methods for determining the step direction are usually referred to as "momentum" based methods.

Once the edge values of the neural network 600 have been updated through the backpropagation process, the neural network 600 will likely produce different outputs than it did previously. Thus, the procedure of propagating at least one input from the M training pairs through the neural network 600, comparing the neural network output with the associated target output from the M training pairs with a loss function, computing the gradient of the loss function with respect to the edge values, and updating the edge values with a step guided by the gradient is repeated until a termination criterion is reached. Common termination criteria include, but are not limited to, reaching a fixed number of edge updates (otherwise known as an iteration counter), reaching a diminishing learning rate, noting no appreciable change in the loss function between iterations, or reaching a specified performance metric as evaluated on the M training pairs or separate hold-out training pairs (denoted "validation pairs"). Once the termination criterion is satisfied, the edge values are no longer altered and the neural network 600 is said to be "trained."

Following the selection of the neural network 600 and associated hyperparameters, training, and validation, the neural network 600 may be deployed for use. As such, the neural network 600 may be used to obtain the nth set of injection values (i.e., the actions $a_n$ 504) from the nth set of output values (i.e., the states $s_n$ 506).

The neural network 600 may be retrained using additional WAG data obtained from the reservoir simulator 404 and/or measured from the formation 204. In these embodiments, retraining may be considered to use transfer learning.

In these embodiments, the nth set of output values may be input into the AI model. The nth set of output values may be the states 506 of the formation 204 described in FIG. 2 or the modeled formation within the reservoir simulator 404 described in FIG. 4. The (n+1)th set of injection values may then be obtained from the AI model. Next, the (n+1)th set of injection values may be either input into the reservoir simulator 404 or used to determine an nth amount of $CO_2$ and an nth amount of the treatment fluid to be injected in turn into the hydrocarbon reservoir 202 within the formation 204. In turn, an (n+1)th set of output values may be obtained from the reservoir simulator 404 or an (n+1)th amount of hydrocarbons may be extracted from the hydrocarbon reservoir 202 within the formation 204 while an (n+1)th value of the stored amount of carbon dioxide is determined from the formation 204. The AI model may then be rewarded or penalized based on the nth set of output values and the (n+1)th set of output values. The AI model may then be retrained using the (n+1)th set of injection values and the (n+1)th set of output values. This process may be repeated for any number of N cycles.

Figure 7:
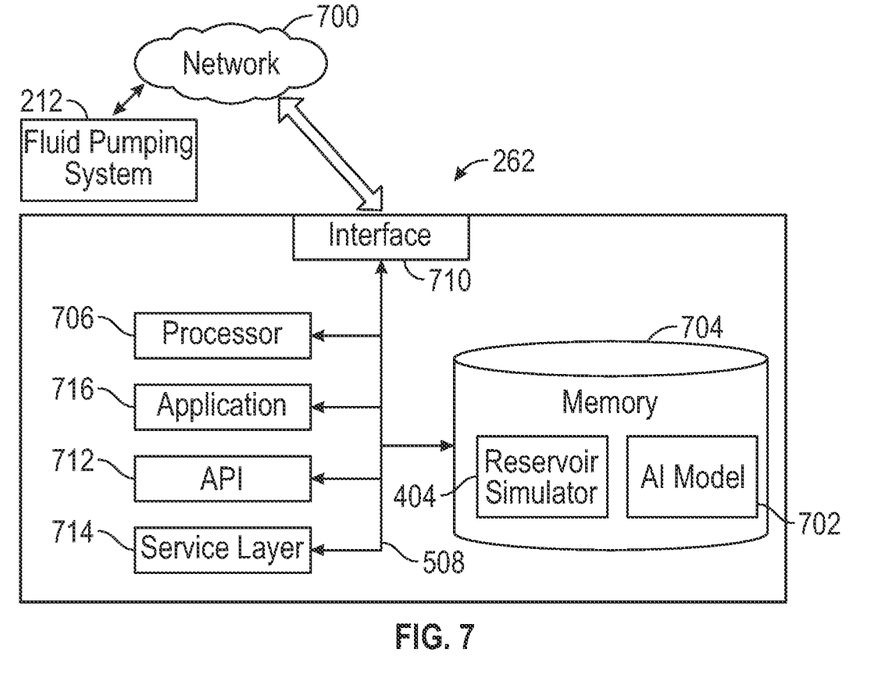
FIG. 7 illustrates a computer system in accordance with one or more embodiments.

Turning to FIG. 7, FIG. 7 illustrates a generic computer system 262 in accordance with one or more embodiments. Hereinafter, FIG. 7 is used to describe one computer system 262 configured to communicate with the fluid pumping system 212 via the network 700 and store both the reservoir simulator 404 and the AI model 702 within a memory 704 each of which may be used by the computer system 262. However, a person of ordinary skill in the art will appreciate that more than one computer system 262 may be used without departing from the scope of the disclosure.

For example, in other embodiments, a different computer system 262, which may or may not be configured to communicate with the fluid pumping system 212 via the network 700, may be configured to store the reservoir simulator 404, AI model 702, or both. Further, one computer system 262 may be configured to train and use the AI model 702. In other embodiments, one computer system 262 may be configured to train the AI model 702 while another computer system 262 may be configured to use the AI model 702.

Each component of the computer system 262 illustrated in FIG. 7 will now be described in detail.

The computer system 262 may be configured to provide computational functionalities associated with described AI models 702, reservoir simulators 404, WAG processes and other algorithms, methods, functions, processes, flows, and procedures as described in this disclosure, according to one or more embodiments. The illustrated computer system 262 is intended to encompass any computing device such as a server, desktop computer, laptop/notebook computer, wireless data port, smart phone, personal data assistant (PDA), tablet computing device, one or more processors 706 within these devices, or any other suitable processing device, including both physical or virtual instances (or both) of the computing device. Additionally, the computer system 262 may include an input device, such as a keypad, keyboard, touch screen, or other device that can accept user information, and an output device that conveys information associated with the operation of the computer system 262, including digital data, visual, or audio information (or a combination of information), or a graphical user interface (GUI).

The computer system 262 can serve in a role as a client, network component, a server, a database or other persistency, or any other component (or a combination of roles) for performing the subject matter described in the instant disclosure. The illustrated computer system 262 is communicably coupled with the network 700. In some implementations, one or more components of the computer system 262 may be configured to operate within environments, including cloud-computing-based, local, global, or other environment (or a combination of environments).

At a high level, the computer system 262 is an electronic computing device operable to receive, transmit, process, store, or manage data and information associated with the described subject matter. According to some implementations, the computer system 262 may also include or be communicably coupled with an application server, e-mail server, web server, caching server, streaming data server, business intelligence (BI) server, or other server (or a combination of servers).

The computer system 262 can receive requests over the network 700 from a client application (for example, executing on another computer system 262) and responding to the received requests by processing the said requests in an appropriate software application. In addition, requests may also be sent to the computer system 262 from internal users (for example, from a command console or by other appropriate access method), external or third-parties, other automated applications, as well as any other appropriate entities, individuals, systems, or computers.

Each of the components of the computer system 262 can communicate using a system bus 708. In some implementations, any or all of the components of the computer system 262, both hardware or software (or a combination of hardware and software), may interface with each other or the interface 710 (or a combination of both) over the system bus 708 using an application programming interface (API) 712 or a service layer 714 (or a combination of the API 712 and service layer 714. The API 712 may include specifications for routines, data structures, and object classes. The API 712 may be either computer-language independent or dependent and refer to a complete interface, a single function, or even a set of APIs. The service layer 714 provides software services to the computer system 262 or other components (whether or not illustrated) that are communicably coupled to the computer system 262. The functionality of the computer system 262 may be accessible for all service consumers using this service layer. Software services, such as those provided by the service layer 714, provide reusable, defined business functionalities through a defined interface. For example, the interface may be software written in JAVA, C++, or other suitable language providing data in extensible markup language (XML) format or another suitable format. While illustrated as an integrated component of the computer system 262, alternative implementations may illustrate the API 712 or the service layer 714 as stand-alone components in relation to other components of the computer system 262 or other components (whether or not illustrated) that are communicably coupled to the computer system 262.

Moreover, any or all parts of the API 712 or the service layer 714 may be implemented as child or sub-modules of another software module, enterprise application, or hardware module without departing from the scope of this disclosure.

The computer system 262 includes an interface 710. Although illustrated as a single interface 710 in FIG. 7, two or more interfaces 710 may be used according to particular needs, desires, or particular implementations of the computer system 262. The interface 710 is used by the computer system 262 for communicating with other systems in a distributed environment that are connected to the network 700. Generally, the interface 710 includes logic encoded in software or hardware (or a combination of software and hardware) and operable to communicate with the network 700. More specifically, the interface 710 may include software supporting one or more communication protocols associated with communications such that the network 700 or interface's hardware is operable to communicate physical signals within and outside of the illustrated computer system 262.

The computer system 262 includes at least one computer processor 706. Although illustrated as a single computer processor 706 in FIG. 7, two or more processors may be used according to particular needs, desires, or particular implementations of the computer system 262. Generally, the computer processor 706 executes instructions and manipulates data to perform the operations of the computer system 262 and any algorithms, methods, functions, processes, flows, and procedures as described in the instant disclosure.

The computer system 262 also includes a memory 704 that holds data for the computer system 262 or other components (or a combination of both) that can be connected to the network 700. For example, memory 704 can be a database storing data consistent with this disclosure. Although illustrated as a single memory 704 in FIG. 7, two or more memories may be used according to particular needs, desires, or particular implementations of the computer system 262 and the described functionality. While memory 704 is illustrated as an integral component of the computer system 262, in alternative implementations, memory 704 can be external to the computer system 262.

The application 716 is an algorithmic software engine providing functionality according to particular needs, desires, or particular implementations of the computer system 262, particularly with respect to functionality described in this disclosure. For example, application 716 can serve as one or more components, modules, applications, etc. Further, although illustrated as a single application 716, the application 716 may be implemented as multiple applications 716 on the computer system 262. In addition, although illustrated as integral to the computer system 262, in alternative implementations, the application 716 can be external to the computer system 262.

There may be any number of computer systems 262 associated with, or external to, a computer system 262 containing a computer system 262, wherein each computer system 262 communicates over the network 700. Further, the term "client," "user," and other appropriate terminology may be used interchangeably as appropriate without departing from the scope of this disclosure. Moreover, this disclosure contemplates that many users may use one computer system 262, or that one user may use multiple computer systems 262.

Figure 8:
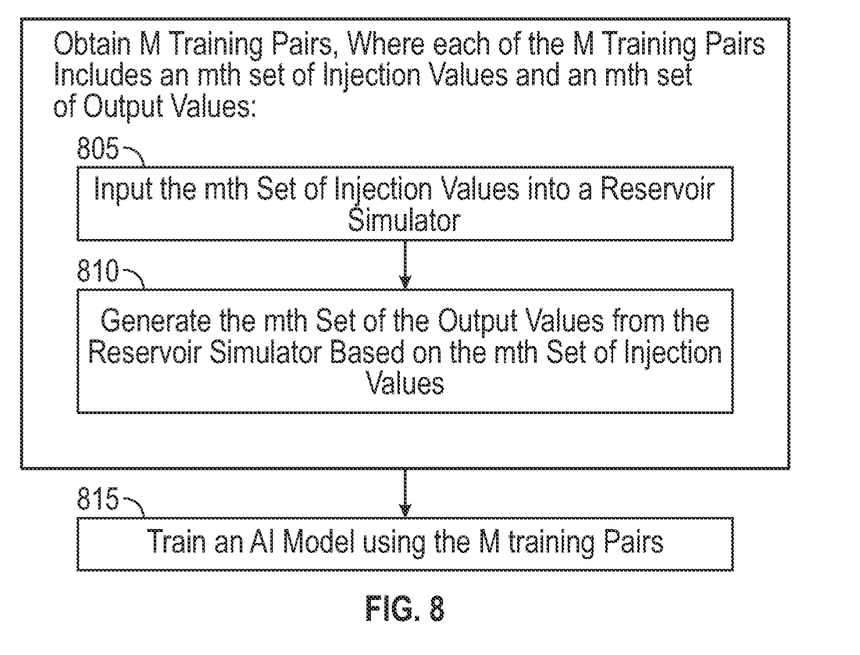
FIG. 8 shows a flowchart in accordance with one or more embodiments.

FIG. 8 describes a method of training an AI model 702 in accordance with one or more embodiments. Turning to FIG. 8, M training pairs are obtained. Recall that M is an integer greater than or equal to one. Each of the M training pairs may be generically denoted an mth training pair, where m is a count of the training pairs by one from one to M. Further, each of the M training pairs (i.e., the mth training pair) includes an mth set of injection values 400 and an mth set of output values 408.

In block 805, the mth set of injection values 400 are input into the reservoir simulator 404. As previously described relative to FIGS. 2 and 4, the reservoir simulator 404 may mathematically model one or more WAG processes being performed within a formation 204. The reservoir simulator 404 may mathematically model the rock and the hydrocarbon reservoir 202 within the formation 204 as porous media. The reservoir simulator 404 may mathematically model fluid flow of $CO_2$, the treatment fluid, and the hydrocarbons using principles of fluid dynamics. The mth set of injection values 400 input into the reservoir simulator 404 includes the mth value of the injection amount of $CO_2$ 402 and the mth value of the injection amount of the treatment fluid 406. Each value may correspond to a volume, density, concentration, and/or rate.

In block 810, the mth set of output values 408 are generated from the reservoir simulator 404. The mth set of output values 408 includes the mth value of the stored amount of $CO_2$ that may be stored within the modeled hydrocarbon reservoir of the reservoir simulator 404 and the mth value of the produced amount of hydrocarbons 412 that may be extracted from the modeled hydrocarbon reservoir of the reservoir simulator 404. In some embodiments, the mth set of output values 408 are directly generated from the reservoir simulator 404. In other embodiments, an mth set of output probability distributions are generated from the reservoir simulator 404 and the mth set of output values 408 are sampled from the mth set of output probability distributions. Sampling methods may include, but are not limited to, random sampling. Monte Carlo sampling, and bootstrapping. In practice, tens to thousands of training pairs may be generated.

In block 815, the AI model 702 is trained using the M training pairs. The AI model 702 may include the neural network 600 that is trained. In other embodiments, the AI model 702 may include a MDP 500 that includes a policy 508 that includes the neural network 600 that is trained. As previously described relative to FIG. 6, the process of backpropagation may use the M training pairs to train the neural network 600 within the AI model 702. Following training, the AI model 702 may be deployed for use to obtain an (n+1)th set of injection values from an nth set of output values. Here, n is a count by one from one to N by where N is an integer greater than or equal to one.

The AI model 702 may be retrained one or more times using additional data obtained from the AI model 702, the reservoir simulator 404, the formation 204, or a combination thereof. In these embodiments, the AI model 702 may use reinforcement learning in the form of a rewards system as previously described.

Figure 9:
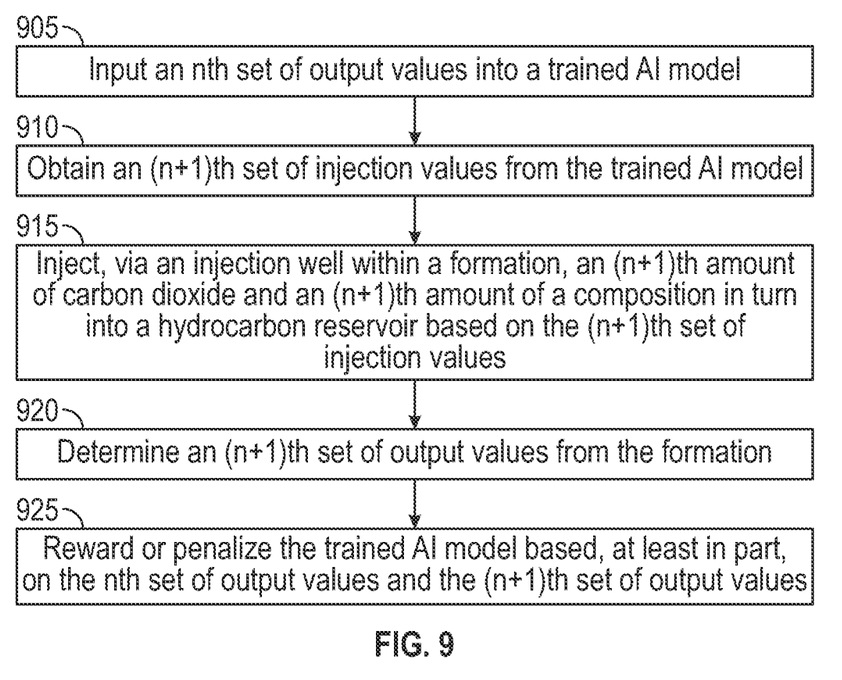
FIG. 9 shows a flowchart in accordance with one or more embodiments.

FIG. 9 describes a method of extracting hydrocarbons from the formation 204 and storing $CO_2$ in the formation 204 using the trained AI model 702 in accordance with one or more embodiments. In one or more embodiments, the method uses the treatment fluid. In other embodiments, the method uses a fluid, which may be water. The method described in FIG. 9 may be performed for each of N cycles where the current cycle is denoted the nth cycle. Recall that N is an integer greater than or equal to one and n is a count from one to N by integer.

Here, the trained AI model 702 may be considered a controller that uses reinforcement learning to facilitate meeting the contradictory goals of mitigating the release of greenhouse gases into the atmosphere while increasing the extraction of the hydrocarbons from the hydrocarbon reservoir 202 for each cycle of the non-traditional WAG process.

In block 905, the nth set of output values is input into the trained AI model 702. The nth set of output values includes an nth value of the stored amount of $CO_2$ within the formation 204 and an nth value of a produced amount of hydrocarbons extracted from the formation 204. The nth set of output values may be the current states $s_n$ 506 of the formation 204 as described in FIG. 5. In other embodiments, the nth set of output values may be assigned randomly, based on historical WAG data, or based on data obtained from the reservoir simulator 404. Here, the trained AI model 702 has been previously trained one or more times.

In block 910, the (n+1)th set of injection values is obtained from the trained AI model 702. The (n+1)th set of injection values includes an (n+1)th value of an injection amount of $CO_2$ and an (n+1)th value of an injection amount of the treatment fluid. The (n+1)th set of injection values may be the current actions $a_n$ 504 to be implemented within the formation 204 as described in FIGS. 2 and 4.

In block 915, an (n+1)th amount of $CO_2$ and an (n+1)th amount of the treatment fluid are injected into the hydrocarbon reservoir 202 in turn based on the (n+1)th set of injection values. Injection may be performed using the injection system 214 within the fluid pumping system 212 as described in FIG. 2. The injection system 214 may inject the (n+1)th amount of $CO_2$ and the (n+1)th amount of the treatment fluid into the hydrocarbon reservoir 202 via the injection well 206 within the formation 204.

In block 920, an (n+1)th set of output values is determined from the formation. To do so, an (n+1)th amount of hydrocarbons is extracted from the hydrocarbon reservoir 202. Extraction may be performed using the production system 216 within the fluid pumping system 212 as described in FIG. 2. The production system 216 may extract the (n+1)th amount of hydrocarbons from the hydrocarbon reservoir 202 via the production well 208 within the formation 204. Further, an (n+1)th value of the produced amount of hydrocarbons is determined from the (n+1)th amount of hydrocarbons. Further still, an (n+1)th value of the stored amount of $CO_2$ is determined within the hydrocarbon reservoir 202. The (n+1)th value of the produced amount of hydrocarbons and the (n+1)th value of the stored amount of $CO_2$ may be measured and stored using meters within the fluid pumping system 212.

In block 925, the trained AI model 702 is rewarded or penalized based, at least in part, on the nth set of output values and the (n+1)th set of output values. The trained AI model 702 may be rewarded or assigned a positive reward if the current states 506 of the formation 204 are desirable. Desirable states may occur when an increased amount of $CO_2$ is stored in the hydrocarbon reservoir 202 for the current cycle (n+1) relative to the previous cycle n and an increased amount of hydrocarbons is extracted from the hydrocarbon reservoir 202 for the current cycle (n+1) relative to the previous cycle n. In other words, additional $CO_2$ is stored and additional hydrocarbons are extracted after each cycle N. Undesirable states may occur when only one or neither of the desirable states occur.

Embodiments of the present disclosure may provide at least one of the following advantages. Using the water alternating gas process with the treatment fluid allows for more effective extraction of residual hydrocarbons because of the impact this treatment fluid has on the reduction in interfacial tension and increase in solubility of carbon dioxide in the aqueous phase (the treatment fluid). These properties of the treatment fluid allow an improved extraction of hydrocarbons. While optimizing extraction of residual hydrocarbons, this process provides a means for simultaneous sub-surface carbon dioxide storage to reduce environmental carbon dioxide emissions. The artificial intelligence model further improves the yield of hydrocarbons by optimizing the injection amounts of carbon dioxide and the treatment fluid, while simultaneously maximizing sub-surface carbon dioxide storage.

EXAMPLES

Hereinafter, examples are provided that demonstrate the encapsulation, increased stability, and reduced IFT as described in the Detailed Description section.

The treatment fluid demonstrates high stability under expected reservoir temperatures and pressures due to the composition and its encapsulation. The metal oxide nanoparticles are particularly beneficial over other nanoparticles, such as silica-based nanoparticles, because of their smaller size and higher stability in reservoir conditions. Iron oxide nanoparticles are exemplary of metal oxide nanoparticles. Further, the paramagnetic characteristics of the iron oxide nanoparticles allow for mapping during the injection phase, which is useful in situations with a shallow formation, as the magnetic nanoparticles can be coupled with electromagnetic mapping to characterize the formation and enhance production from that zone.

In order to evaluate the stability of the treatment fluid, treatment fluid was tested in a laboratory setting at temperatures above 70° C. and above salinities of 30,000 ppm. The treatment fluid demonstrated high colloidal stability at 90° C. in the presence of hot brine for nearly a year. Dynamic light scattering analysis and interfacial tension measurements provided data to evaluate the effectiveness and stability of the treatment fluid. The encapsulation was verified using Cryo-transmission electron microscopy (TEM) which showed empty capsules after following a simple mixing procedure, and successfully encapsulated nanoparticles after following the procedure outlined in FIG. 1. TEM images demonstrate the structure of the nanoparticles. The images show that a portion of the encapsulated nanoparticles contain multi-layer membranes while others are single layer, potentially due to the coalescence of some capsules together. The images detect encapsulated nanoparticles over 5 nm.

Figure 10:
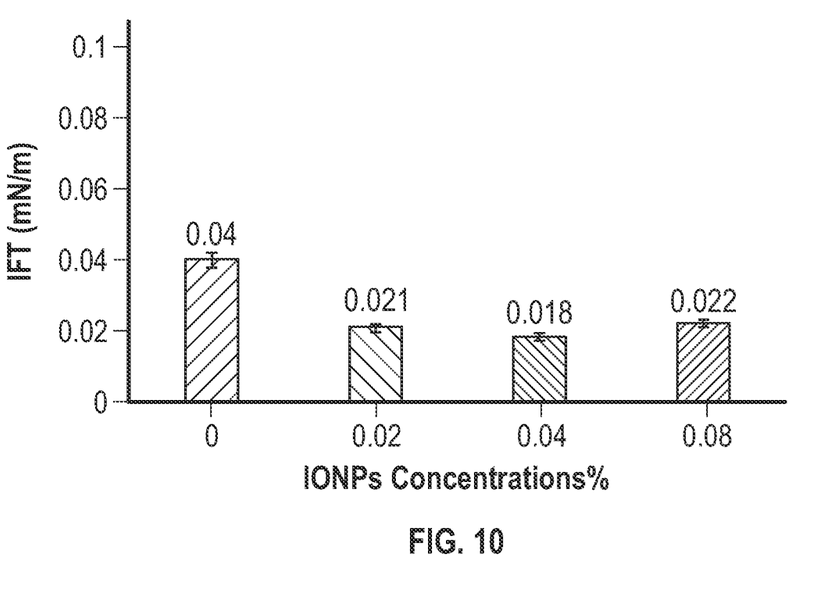
FIG. 10 is a bar chart of interfacial tension measurements in accordance with one or more embodiments.

Referring to FIG. 10, the interfacial tension (IFT) was quantified in the presence of the treatment fluid for four concentrations of iron-oxide nanoparticles by % weight. Table 1 shows the composition of the four fluids used. In the table, the metal oxide nanoparticles are referred to as SPIONS, or superparamagnetic iron oxide nanoparticles.

TABLE 1

Compositions of nanofluids used for testing

| Sample ID | Petronate HL/L (g) | 5 nm SPIONs (mL) | wt. % of SPIONS in 5 wt. % Petronate HL/L solution |
|---|---|---|---|
| 0 | 0.5 | 0 | 0 |
| NF 1 | 0.5 | 0.3 | 0.02 |
| NF 2 | 0.5 | 0.6 | 0.04) |
| NF 3 | 0.5 | 0.9 | 0.08 |

The interfacial tension is shown to decrease by approximately 50% for concentrations of nanoparticles in the treatment fluid ranging from about 0.02% to 0.08% by weight. The resulting stability data and demonstrated reduction in interfacial tension in the presence of the treatment fluid indicated suitability of this formulation for enhanced hydrocarbon recovery applications. The interfacial tension was evaluated at varying concentrations of nanoparticles in the treatment fluid, including 0.02%, 0.04%, and 0.08% and showed reductions in the interfacial tension ranging between 45% and 55%. In the tests, the aqueous phase was a seawater and crude oil was utilized. Measurements were done at 95° C. after the samples were incubated in the oven in the presence of the crude oil for over 24 hours until the interfacial tension values were equilibrated. The interfacial tension was then measured using a Kruss spinning drop instrument.

In addition to quantifiable measurements, two sets of samples were created for each nanofluid concentration assessed above. In the first set of samples, the encapsulation was conducted with the second surfactant and the nanoparticles. In the second set of samples, the encapsulation was conducted with the first surfactant and the nanoparticles. The results showed visible differences at time increments of 24 hours, 48 hours, and 72 hours. Notably, the first set of samples showed instability, as the samples began to form an agglomeration within the fluid once 72 hours had elapsed. The second set of samples showed even dispersion consistently between the start time and 72 hours.

The encapsulation, stability in brine, and reduced IFT of the treatment fluid demonstrated that the treatment fluid may be suitable for use in WAG processes to enhance hydrocarbon recovery.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A treatment fluid, comprising:
   an aqueous colloid comprising:
      a brine;
      0.02 to 0.08% by weight of a nanoparticle;
      5% to 50% by weight of a first surfactant in the form of a micelle around the nanoparticle, wherein the first surfactant comprises petroleum sulfonate; and
      a second surfactant encapsulating the micelle around the nanoparticle.

2. The treatment fluid of claim 1, wherein the second surfactant comprises cocamidopropyl hydroxysultaine.

3. The treatment fluid of claim 1, wherein the nanoparticle comprises a metal oxide.

4. The treatment fluid of claim 3, wherein the metal oxide is selected from the group consisting of iron oxide, magnesium oxide, zinc oxide, aluminum oxide, and combinations thereof.

5. The treatment fluid of claim 1, wherein the treatment fluid comprises the second surfactant in an amount ranging from about 5% to 50% by weight of the treatment fluid.

6. The treatment fluid of claim 1, wherein the treatment fluid is stable for a year or more under conditions of a temperature of 70 degrees Celsius (° C.) or more and a salinity of 30,000 parts per million (ppm) or more.

7. A method for preparing a treatment fluid, comprising:
   mixing a metal oxide nanoparticle with a first surfactant to form an intermediate solution containing a metal oxide nanoparticle capsule in the form of a micelle around the nanoparticle, wherein the first surfactant comprises petroleum sulfonate; and adding a second surfactant to the intermediate solution, wherein a sequential addition of the first surfactant and the second surfactant encapsulates the metal oxide nanoparticle capsule to form the treatment fluid;

wherein the treatment fluid comprises 0.02% to 0.08% by weight of the metal oxide nanoparticles and 5% to 50% by weight of the first surfactant.

8. The method of claim 7, wherein the second surfactant comprises cocamidopropyl hydroxysultaine.

9. The method of claim 7, wherein the nanoparticle comprises a metal oxide.

10. A method of extracting hydrocarbons from a well environment and storing carbon dioxide in the well environment comprising:

injecting, via an injection well in the well environment, a first amount of carbon dioxide and a first amount of a treatment fluid in turn into a hydrocarbon reservoir;

extracting, via a production well in the well environment, a produced amount of the hydrocarbons from the hydrocarbon reservoir; and determining a byproduct amount of the carbon dioxide extracted from the well environment;

wherein the treatment fluid comprises an aqueous colloid comprising a nanoparticle and a first surfactant wherein the first surfactant is in the form of a micelle around the nanoparticle; and a second surfactant encapsulating the micelle around the nanoparticle;

wherein the treatment fluid comprises 0.02% to 0.08% by weight of the metal oxide nanoparticles and 5% to 50% by weight of the first surfactant.

11. The method of claim 10, further comprising:

inputting a value of the byproduct amount of the carbon dioxide and a value of the produced amount of hydrocarbons into a trained artificial intelligence model; and obtaining a value of a second amount of carbon dioxide and a value of a second amount of the treatment fluid from the trained artificial intelligence model.

12. The method of claim 11, wherein the trained artificial intelligence model comprises a Markov decision process.

13. The method of claim 10, further comprising separating the produced amount of hydrocarbons as a final product from a byproduct amount of the treatment fluid and the byproduct amount of the carbon dioxide.

14. The method of claim 10, further comprising recycling the byproduct amount of the treatment fluid and the byproduct amount of the carbon dioxide for reinjecting.

* * * * *